Sept. 15, 1953   F. H. STEARNS ET AL   2,652,297
FASTENING DEVICE
Filed Aug. 19, 1949
2 Sheets-Sheet 2

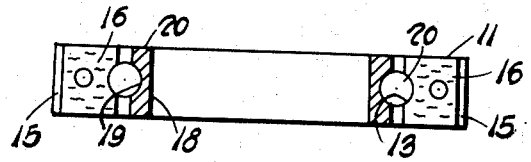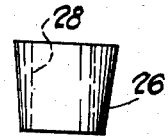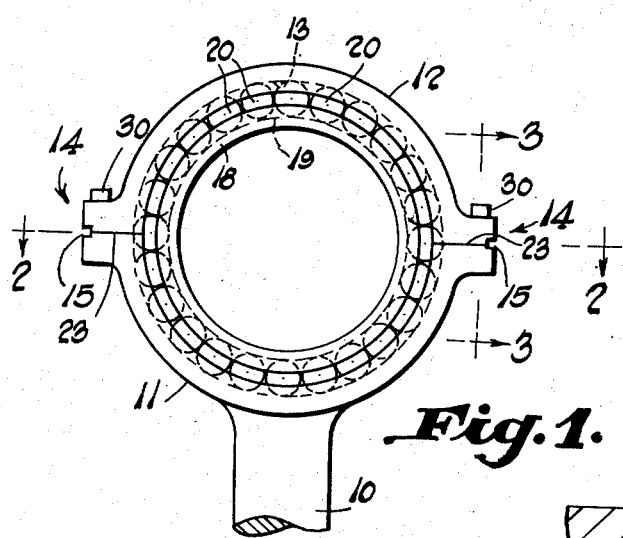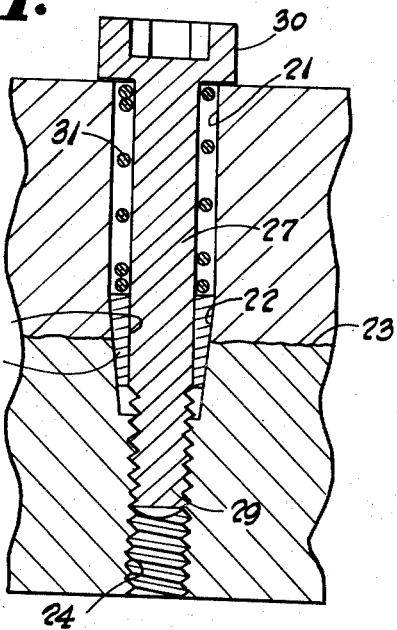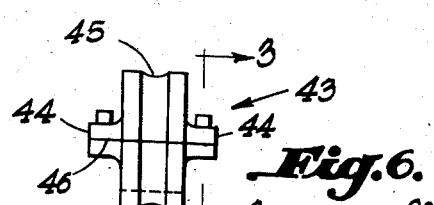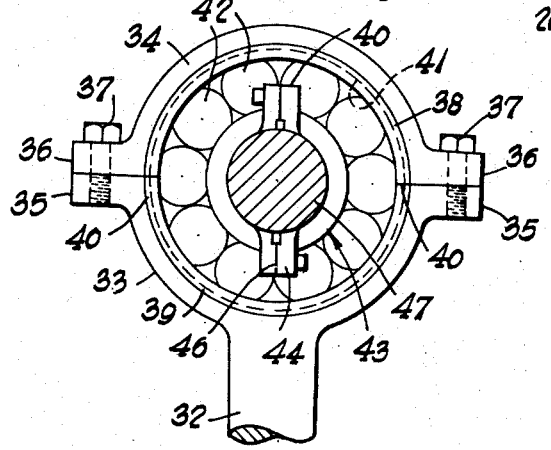

INVENTORS
Frank H. Stearns
Arthur J. Thibault
BY
Chester A. Williams

Patented Sept. 15, 1953

2,652,297

UNITED STATES PATENT OFFICE 2,652,297

FASTENING DEVICE

Frank H. Stearns, Meriden, and Arthur J. Thibault, Enfield, N. H.; said Stearns assignor to said Thibault Application August 19, 1949, Serial No. 111,302

6 Claims. (Cl. 308—189)

The present invention relates to fastening devices for machine elements, an object of the invention being to provide a simple and efficient fastening means for securing machine elements together, and occupying a minimum of space.

In the art of making split bearing races, for example, the problem of fastening together the components parts is often a difficult one, due to the limitations of space. For some applications, it is impossible to allow space enough for both dowel pins and securing bolts, or other fastening means, and thus it is an object of this invention to provide an efficient fastening device which can be simultaneously employed for both securing a pair of machine elements together, as well as for accurately maintaining such elements in proper alignment.

Under ordinary circumstances, machine elements, such as a pair of split bearing races, require bolts for securing them together and dowel pins for maintaining the elements in accurate alignment, and such securing and aligning means require an appreciable amount of space, which makes for a rather ungainly unit, particularly if the entire bearing structure is of small overall dimensions. By utilizing the present invention, the overall dimensions of the machine elements which must be fastened together, may be greatly decreased.

In the past, tapered screws have been employed for both securing and aligning a pair of machine elements together, and such means have proved rather successful when the machine elements to be fastened have a substantial wall thickness. However, when the wall thickness of such elements is rather thin, it has been found that such taper screws tend to distort the elements. This is particularly true when a taper screw is employed for securing and aligning a pair of fractured bearing elements together, for in such a case it has been found that when the tapered screw is drawn tight, the fractured areas distort and thus the opposing surfaces of the two elements are spread apart to the end that a poor bearing surface results. This same condition prevails whenever dowel pins are employed for aligning or piloting a pair of fractured bearing elements together. Therefore, it is an object of the present invention to provide a fastening and aligning means which may be employed with thin walled machine elements without causing such elements to distort.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

In the drawings—

Fig. 1 represents a crank shaft having a ball bearing unit incorporated therein of the type which employs a split outer bearing ring, which outer ring incorporates therein the present invention.

Fig. 2 represents a sectional view taken substantially along the line 2—2 of Fig. 1.

Fig. 3 represents, on an enlarged scale, a sectional view taken substantially along the line 3—3 of either Fig. 1 or Fig. 6.

Fig. 4 represents a taper sleeve of the type disclosed in Fig. 3.

Fig. 5 represents a crank shaft having a ball bearing unit incorporated therein of the type which employs split inner and outer bearing rings, of which the inner bearing ring incorporates therein the present invention.

Fig. 6 represents a side elevation view of the inner bearing race disclosed in Fig. 5.

Figure 7:
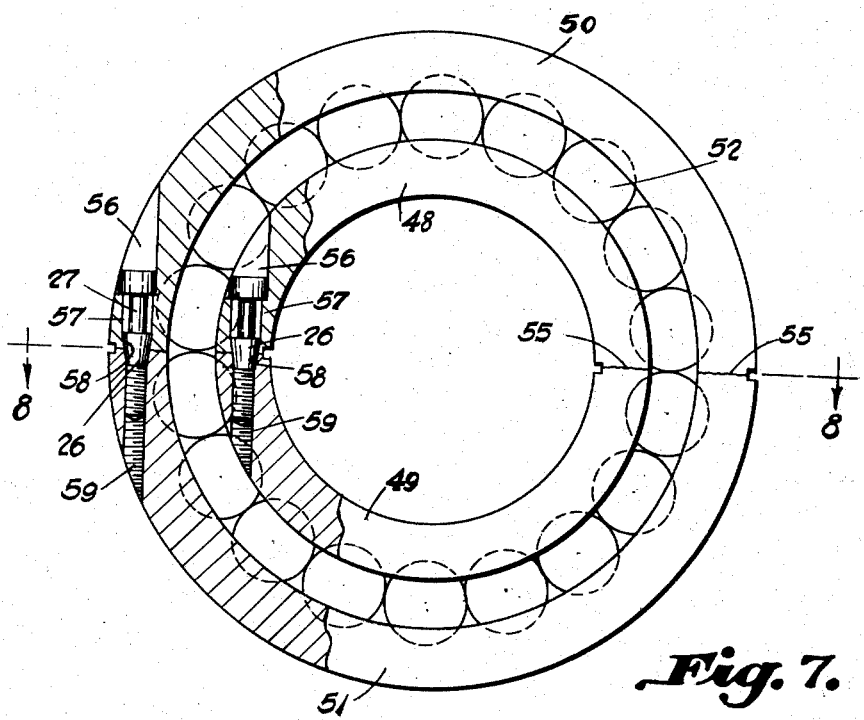
Fig. 7 represents a side elevational view, partly in section, of a divisible race bearing unit, which section is taken substantially along the line 7—7 of Fig. 8.

Although the present invention is adapted for securing various types of machine elements together, the applicants have chosen to illustrate their invention in connection with bearings of the split or fractured type, for the present invention is admirably suited for such use. Referring particularly to Figs. 1 and 2, there is disclosed a crank 10 having its head portion made up of two semicircular outer bearing rings 11 and 12 which are detachably secured together by means hereinafter described. In constructing the head portion of the crank, the elements 11 and 12 are initially formed from a single cylindrical piece of metal in a manner as best disclosed in the United States patent of Winslow S. Pierce, Jr., No. 1,498,748, dated June 24, 1924. The cylinder is machined to its final dimensions both inside and out. The inner diameter is provided with a ball groove 13 which is carefully machined and polished in the usual manner. The number of these grooves is immaterial to the present invention, but in the drawing, a single groove 13 is shown.

During the process of machining the cylinder, two lugs are shaped thereon, these lugs being diametrically opposed to each other and symmetrically arranged with respect to the crank 10. Each of these lugs is generally indicated by the numeral 14, 14. Suitable holes may be drilled in each of the lugs 14, 14, as will be hereinafter described, for the purpose of receiving fastening means. After these holes have been formed, saw cuts 15 are made in the plane of the lugs, and these cuts are preferably made as narrow as possible.

After the cylinder has been machined to the proper dimensions, and the holes and saw cuts 15, 15 have been formed in the lugs, the cylinder is ready to be hardened. This hardening is accomplished by the usual heat treating method, the ultimate degree of hardness being immaterial to the present invention.

After the cylinder is hardened, it is broken along the weak plane defined by the saw cuts 15, 15. The breaking force, which may be applied by any suitable means, is preferably applied at right angles to the plane of the fracture, so as to produce the fractured or broken surfaces which are best illustrated in Fig. 2, and which are designated by the numerals 16, 16. Care must be taken not to injure the broken surfaces 16, 16, for it is necessary for the two parts to fit together exactly, in order that there be no break in the smooth ball-receiving groove 13.

In order to complete the present ball bearing structure, it is necessary to provide an inner race ring 18 of conventional design, and which incorporates therein the usual outer ball-receiving groove 19. Those skilled in the art will readily appreciate that with the outer bearing ring made up of two separable rings 11 and 12, a full complement of bearing balls may be easily inserted between the outer and inner rings without requiring any filling slot. These bearing balls are generally designated by the numeral 20. Once a full complement of balls has been placed between the inner and outer rings, the lugs 15, 15 may receive fastening means for the purpose of locking the components 11 and 12 together, thereby to complete the bearing structure.

Those skilled in the art realize that the success of a split type bearing depends upon the accuracy with which the two split or fractured rings are secured together. Quite obviously, if the rings 11 and 12 are not mated together with care, the smoothness of the outer bearing groove 13 would be dangerously impaired. Furthermore, in securing the two rings 11 and 12 together, it is highly advantageous to provide securing means which will require a minimum of space, and which will not distort the fractured surfaces of the mating rings. Thus, the present invention is designed to fulfill these needs.

As hereinabove noted, the lugs 15, 15 are provided, before the cylinder is hardened, with holes for receiving a fastening means. Referring particularly to Fig. 3, the present invention contemplates that each of these holes includes an upper cylindrical opening 21, an intermediate portion of which is formed in a tapered fashion, as indicated by the numeral 22. It is to be particularly noted that the tapered portion of the hole is formed in the area of the fracture, so that the parting line 23 of the fracture passes through an intermediate portion of the taper 22. The lower portion of this hole is of a reduced diameter, and is threaded as is indicated by the numeral 24. After a hole of the above described character has been provided in each of the lugs 15, 15, the cylinder is hardened and thereafter fractured so as to form the two separable outer bearing rings 11 and 12. Thereafter, the balls 20, 20 are assembled between the inner race 18 and the composite outer races 11 and 12, whereupon the latter elements 11 and 12 are carefully mated together. In order accurately to locate and align the separable bearing elements 11 and 12 together, the present invention contemplates the use of a thin walled taper bushing 26, which bushing is best illustrated in Fig. 4. A bushing of this type is inserted into each of the apertures 21 so that it will mate properly with the tapered portion 22 of the aperture. This tapered bushing is so dimensioned that it will be received intermediate the ends of the taper 22 so that the parting line 23 will pass intermediate the end portions of the bushing. Those skilled in the art will readily appreciate that when a bushing is so mated within each of the taper holes 22, 22, it will function to align the split rings 11 and 12 so that it will be assured that the fracture surfaces 16, 16 will be most accurately mated together whenever the split elements 11 and 12 are forcibly urged toward each other.

A preferred manner of employing these bushings 26, 26 is to insert one within the upper portion of each of the two tapered holes before the fractured rings are placed together. Thus, the lower portion of each of the bushings will project below the fractured surface of the upper ring so that as the rings are mated together, the two projecting bushings will function to pilot the two rings into proper alignment, without any danger of injuring the fractured surfaces.

In order to secure the separable outer race elements 11 and 12 together, the present invention contemplates the provision of a bolt 27, the shank portion of which is adapted to be slidingly received within the aperture 28 provided in the taper bushing 26. The one end portion of the bolt 27 is threaded as at 29 so that as the bolt is turned in the usual fashion, its threaded end will mate with the threaded portion 24 of the lug aperture. As each of the bolts 27, 27 is screwed within the respective one of the lugs 15, 15, the head portion 30 of the bolt will ultimately engage the upper portion of the lug so as to lock the elements 11 and 12 together. If desired, a helical spring 31 may be inserted within the portion 21 of the lug aperture, so as to urge the taper bushing 26 forcibly into proper engagement with the taper portion 22 of the lug aperture. However, it has been found that such a helical spring is not necessary in all applications of the present invention.

It is to be particularly observed that the present fastening means is so constructed that as the bolt is tightened, it will not tend to drive the taper bushing downwardly into the tapered hole and thus distort the metal in the zone of the fractured surfaces. This is an important feature of the present invention, for such distortion of the metal (which is caused by either a dowel pin or a taper screw) tends to force the opposing surfaces of the two rings apart to the end that the surface of the ball-receiving groove is completely damaged.

From the above, it is manifest that the present invention functions not only to hold the elements 11 and 12 in accurate alignment, but it, at the same time, functions to lock the elements 11 and 12 forcibly together. Furthermore, it will be appreciated that the present invention comprises a fastening means which requires a minimum of space, to the end that the lugs 15, 15 of the bearing unit disclosed in Fig. 1 may be constructed with minimum overall dimensions.

Figs. 5 and 6 illustrate another form of split or fractured bearing construction which may advantageously employ the present invention. Referring first to Fig. 5, there is disclosed a crank 32 having its head portion formed of two semicircular elements 33 and 34, in a conventional manner. These elements 33 and 34 are formed with lugs 35 and 36 which are suitably secured together by means of conventional type bolts 37, 37.

The elements 33 and 34 function to lock together a pair of split outer semicircular bearing elements 38 and 39, which two elements are formed in the manner of an outer bearing race. This outer race is fractured in a manner as hereinabove described, along the lines designated by the numeral 40, 40. The inner surface of the outer race components 38 and 39 is provided with the usual annular bearing-receiving groove 41 within which the bearing balls 42 are adapted to be received.

In this crank construction, the inner race, which is generally designated by the numeral 43, is also of the split or fractured type, and is best illustrated in Figs. 5 and 6. This inner bearing ring 43 is initially made up as a hollow cylinder which is provided with four lugs 44, 44, of which two are formed at each end of the cylinder. The cylinder is also formed with an outer circumferential groove 45 which is adapted to receive the bearing balls 42, 42. After the cylinder has been machined and hardened, it may be fractured along the lines 46, 46 in a manner as described in connection with that form of crank disclosed in Figs. 1 and 2. This particular type of construction permits the inner bearing race to be assembled about a crank shaft 47, and thereafter the balls 42, 42, along with the split outer ring, may be assembled about the inner race, whereupon the split crank elements 33 and 34 may be locked about the outer race, thereby to complete the bearing structure.

It is contemplated that each of the four lugs 44, 44 of the split inner race 43 may be provided with the present fastening means so that it will be assured that the fractured portions of this inner ring will be accurately mated and secured together. In other words, each of the four lugs 44, 44 is provided with the present fastening means in a manner as is disclosed in Fig. 3. Quite obviously, the present invention as applied to each of the four lugs 44, 44 permits these lugs to be constructed with extremely small overall dimensions and thus, makes for a practicable inner bearing race construction. If, on the other hand, these lugs 44, 44 were to be provided with dowel pins as well as securing bolts, a most ungainly construction would result, for in order to accommodate both the bolts and dowel pins, these lugs would have to be made of exceedingly large dimensions, as opposed to the present construction. On the other hand, if taper screws are employed, the fractured surfaces would be subjected to distortion forces which would tend to separate the fractured surfaces.

Figure 8:
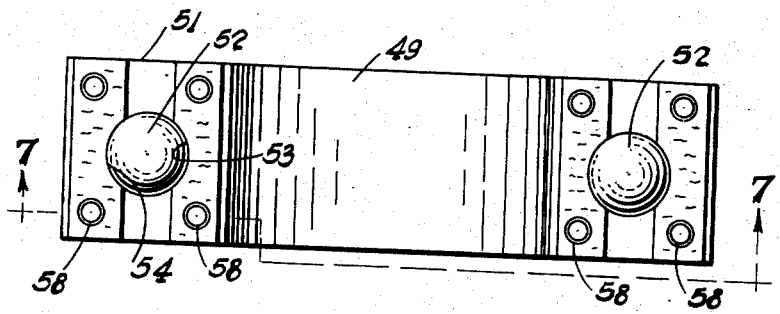
Fig. 8 represents a sectional view taken substantially along the line 8—8 of Fig. 7.

Another type of divisible race bearing unit which may incorporate the present invention therein with advantage is disclosed in Figs. 7 and 8. This unit comprises a pair of split inner race elements 48 and 49 and a pair of outer split elements 50 and 51 with bearing balls 52, 52 disposed within the grooves 53 and 54 formed respectively within the inner and outer races.

Each of the inner and outer races of the modified bearing unit is split or fractured along the parting lines 55, 55 in the same manner as previously described in connection with the bearing structures disclosed in Figs. 1 and 5. Before the inner and outer race elements are hardened and fractured, however, each of them is provided with four apertures of the type substantially disclosed in Fig. 3. More specifically, each of these four apertures includes an upper bolt-head opening 56 and a shank-receiving opening 57.

An intermediate portion of each aperture is formed in a tapered fashion as at 58, while the lower portion thereof is threaded as at 59. After these apertures have been provided within the inner and outer races, the latter elements are then hardened and thereafter fractured in a manner as hereinabove noted. After the balls 52, 52 are assembled between the inner and outer races, the various component race elements may be initially registered with each other by means of the above described taper bushings 26, 26 which are adapted to be seated within the tapered portions 58 of the four apertures.

Thereafter, each of the outer and inner races may have its two component parts secured together by means of four bolts 27, 27 of the same character as is disclosed in Fig. 3. The resulting modified bearing device is particularly advantageous in that it has no projecting lugs of the type employed on the unit disclosed in Figs. 1 and 5. Therefore, such a bearing unit may be employed where space is at a premium.

From the foregoing description, those skilled in the art will appreciate that by utilizing the present invention in connection with bearing units of the type disclosed in the accompanying drawings, or in connection with other machine elements that are to be fastened together, not only is a superior product obtained, but at the same time a reduction in manufacturing costs is effected. For example, the present fastening means eliminates and entirely replaces the dowel pins heretofore employed and thus the need for drilling and reaming dowel pin holes is eliminated. Since the drilling and reaming of holes is a most expensive machine operation, even the elimination of one or more of such operations in each unit of the machine element makes for relatively great savings in production costs. Thus the present invention makes for a most economical fastening device and at the same time provides a fastening device which is most efficient for securing any machine elements together, so that they will be accurately aligned in a predetermined position in the plane of division.

Furthermore, it will be apparent from the foregoing description, that the tapered bushing, or sleeve, which cooperates with each pair of machine elements is of such thin section that it can be readily assembled into the same hole as the associated screw or bolt, without appreciably increasing the diameter of the bolt hole at the large end of the taper. In all cases, the diameter of this hole must be well under the diameter of the bolt head, so that the head can perform its usual function of clamping the machine elements together when drawn tight by the bolt threads.

We claim:

1. The combination with two machine elements having fractured surfaces disposed in approximate alignment, and with said elements providing coaxial frusto-conical seats extending oppositely with respect to said surfaces so that each seat is of appreciable length with respect to a general plane defined by said surfaces, a hollow sleeve having a frusto-conical outer surface fitting within said seats, so as to maintain said elements in alignment with said plane passing through the sleeve intermediate the ends thereof, and a member extending through said sleeve and engaging both said elements to lock them together.

2. An assembly of two members having engaged fractured surfaces disposed in approximate alignment, each member having an opening extending therethrough which provides a tapered seat, with said tapered seats being coaxial and extending oppositely with respect to said surfaces, so that each seat is of appreciable length with respect to a plane defined by said engaged surfaces, a sleeve having a tapered outer surface fitting within said seats so as to maintain said members in alignment, with said plane passing through the sleeve intermediate the ends thereof, and a member extending freely through said sleeve and both of said openings for holding said members together with their fractured surfaces accurately mated.

3. An assembly of two members having engaged fractured surfaces disposed in approximate alignment, each member having an opening extending therethrough which provides a tapered seat, with said tapered seats being coaxial and extending oppositely with respect to said surfaces, so that each seat is of appreciable length with respect to a plane defined by said engaged surfaces, a sleeve having a tapered outer surface fitting within said seats so as to maintain said members in alignment, with said plane passing through the sleeve intermediate the ends thereof, and a member headed at one end and threaded at its other end extending freely through said sleeve and both of said openings for locking said members together with their fractured surfaces accurately mated, said member having its head abutting one of said members and having its other end threaded into the opening in the other of said members.

4. An assembly of two members having engaged surfaces resulting from fracturing a solid sleeve lengthwise, each member having an opening extending therethrough formed prior to the fracturing of said solid sleeve to provide a tapered portion in the area of the fracture so that the parting line of the fracture passes through the tapered portion, with one opening being of greater diameter than the taper and the other opening being of less diameter and threaded, a sleeve having a tapered outer surface fitting within said tapered portion so as to maintain said members in alignment with their fractured surfaces accurately mated, and a member extending freely through said sleeve and both of said openings with a head engaging one member and a portion threaded into the opening of the other member.

5. An assembly of two members originally of one piece that has been fractured to provide surfaces requiring alignment in mating relation, openings extending through said members made while said members were in one piece to provide a tapered portion intermediate the ends of the openings with the plane of fracture passing through said tapered portion, with one opening being of larger diameter than the tapered portion to receive a sleeve having a tapered outer surface fitting within said tapered portion so as to maintain said members in alignment with their fractured surfaces accurately mated, and a member extending freely through said sleeve headed at one end and threaded at the other for holding said members together in the absence of any force applied to said sleeve which would disturb the mating of said fractured surfaces.

6. A ballbearing race made from a cylindrical piece of metal fractured longitudinally, with lugs projecting from the side of the cylindrical piece having fractured surfaces in mating relation, each lug having an opening extending therethrough which provides a tapered seat, with said seats being coaxial and extending oppositely with respect to the fractured surfaces so that each seat is of appreciable length with respect to the plane of engagement of the lugs, a sleeve having a tapered outer surface fitting within said seats so as to maintain the lugs in alignment with their fractured surfaces accurately mated and a member extending freely through said sleeve having a head engaging one lug and having an end portion threaded into the other lug.

FRANK H. STEARNS.
ARTHUR J. THIBAULT.

References Cited in the file of this patent

UNITED STATES PATENTS

| Number | Name | Date |
|---|---|---|
| 252,435 | Damon | Jan. 17, 1882 |
| 980,567 | Schneider | Jan. 3, 1911 |
| 1,246,023 | Kirkham | Nov. 6, 1917 |
| 1,254,636 | Barghausen | Jan. 22, 1918 |
| 1,498,748 | Pierce, Jr. | June 24, 1924 |
| 1,584,711 | Astrom | May 18, 1926 |
| 2,247,125 | Hall | June 24, 1941 |
| 2,560,413 | Carlson | July 10, 1951 |

FOREIGN PATENTS

| Number | Country | Date |
|---|---|---|
| 290,651 | Italy | Nov. 25, 1931 |